(12) United States Patent
Jung et al.

(10) Patent No.: US 8,208,798 B2
(45) Date of Patent: Jun. 26, 2012

(54) INFORMATION STORAGE MEDIUM INCLUDING EVENT OCCURRENCE INFORMATION, APPARATUS AND METHOD FOR REPRODUCING THE SAME

(75) Inventors: Kil-soo Jung, Taean-eup (KR); Sung-wook Park, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1392 days.

(21) Appl. No.: 10/958,275

(22) Filed: Oct. 6, 2004

(65) Prior Publication Data

US 2005/0076392 A1     Apr. 7, 2005

Related U.S. Application Data

(63) Continuation-in-part of application No. 10/916,403, filed on Aug. 12, 2004, now Pat. No. 7,945,141.

(60) Provisional application No. 60/508,315, filed on Oct. 6, 2003.

(30) Foreign Application Priority Data

Oct. 10, 2003  (KR) .......................... 20-2003-070751
Apr. 19, 2004  (KR) .......................... 20-2004-026643
Sep. 21, 2004  (KR) .......................... 20-2004-075488

(51) Int. Cl.
*H04N 5/92*      (2006.01)
*H04N 5/93*      (2006.01)
*H04N 5/935*     (2006.01)
*H04N 9/80*      (2006.01)

(52) U.S. Cl. ......... 386/326; 386/210; 386/353; 386/248
(58) Field of Classification Search .......... 386/111–112, 386/124–125, 326, 353, 248, 210
See application file for complete search history.

(56) References Cited

U.S. PATENT DOCUMENTS

| | | | |
|---|---|---|---|
| 7,945,141 B2* | 5/2011 | Jung et al. ..................... 386/240 |
| 2002/0015581 A1* | 2/2002 | Ando et al. ..................... 386/95 |
| 2002/0166123 A1* | 11/2002 | Schrader et al. ................. 725/58 |
| 2003/0103604 A1 | 6/2003 | Kato et al. |
| 2005/0076078 A1* | 4/2005 | Salton .......................... 709/201 |

(Continued)

FOREIGN PATENT DOCUMENTS

JP          2005-506652          3/2005

(Continued)

OTHER PUBLICATIONS

Office Action issued on Jan. 26, 2007 by the Chinese Intellectual Property Office for Chinese Patent Application No. 200410080582.5.

(Continued)

*Primary Examiner* — Helen Shibru
(74) *Attorney, Agent, or Firm* — NSIP Law (57) ABSTRACT

An information storage medium storing event information for generating an event with reference to an audio/video data structure and an apparatus and method thereof. The information storage medium includes: core data, that includes audio/video data and navigation data for reproducing the audio/video data; and program data that is used for interaction with a user, wherein the program data includes event occurrence information for generating an event with reference to a clip information file including characteristic information for an AV clip constructing the AV data.

25 Claims, 6 Drawing Sheets

U.S. PATENT DOCUMENTS

2005/0169604 A1* 8/2005 Kim et al. .................. 386/69
2010/0281368 A1* 11/2010 Jung et al. .................. 715/716

FOREIGN PATENT DOCUMENTS

| WO | WO 01/22729 | 3/2001 |
| WO | WO 03/036460 A1 | 5/2003 |
| WO | WO 03/036644 | 5/2003 |

OTHER PUBLICATIONS

Japanese Office Action issued on Feb. 2, 2010, in corresponding Japanese Application No. 2004-291839 (3 pages).

Taiwanese Final Office Action issued on Oct. 21, 2010, in corresponding Taiwanese Patent Application No. 93129552 (10 pages).

* cited by examiner

FIG. 6

# INFORMATION STORAGE MEDIUM INCLUDING EVENT OCCURRENCE INFORMATION, APPARATUS AND METHOD FOR REPRODUCING THE SAME

CROSS-REFERENCE TO RELATED APPLICATIONS

This application is a Continuation-In-Part Application of U.S. patent application Ser. No. 10/916,403, filed on Aug. 12, 2004, now U.S. Pat. No. 7,945,141, and claims the priorities of Korean Patent Application No. 2003-70751, filed on Oct. 10, 2003, in the Korean Intellectual Property Office, U.S. provisional Patent Application No. 60/508,315, filed on Oct. 6, 2003, in the US Patent and Trademark Office, Korean Patent Application No. 2004-26643, filed on Apr. 19, 2004, in the Korean Intellectual Property Office, and Korean Patent Application No. 2004-75488, filed on Sep. 21, 2004, in the Korean Intellectual Property Office, the disclosures of which are incorporated herein in their entirety by reference, the disclosures of which are incorporated herein in their entirety by reference.

BACKGROUND OF THE INVENTION

1. Field of the Invention

The invention relates to an information storage medium including event occurrence information and an apparatus and method of reproducing the same, and more particularly, to an information storage medium storing event information for generating an event with reference to an AV data structure and an apparatus and method of reproducing the same.

2. Description of the Related Art

A moving-image data is classified into audio-video (AV) data for a high definition movie and navigation data for controlling reproduction of the AV data. Demand for applications with programming and browsing functions for reinforcing interaction with a user regarding the above-mentioned moving-image data is increasing. However, in order to provide these functions, an application using program data should be executed in synchronization to AV data. In the invention, such application data is referred to as additional data in order to distinguish it from the AV data.

In order to synchronize additional data with AV data, a method of generating an event unconditionally in a predetermined time interval or according to a specific mark included in the AV data, or a method of inserting event occurrence information into a specific scene included in AV data and generating an event according to the event occurrence information, have been proposed. However, there are problems associated with each of these methods. For example, events are unnecessarily generated even when there is no additional data to be synchronized and reproduced with AV data and moreover, it is difficult to change predetermined event occurrence locations since AV data is repeatedly encoded whenever event generation locations change.

SUMMARY OF THE INVENTION

The invention provides an information storage medium including event occurrence information, which is capable of executing an application in synchronization with AV data by including event occurrence information designated based on an AV data structure in program data, and a reproduction apparatus and method thereof.

According to an aspect of the invention, there is provided a reproduction method and apparatus, which record event occurrence information in a format of a binary table to generate and reproduce an event.

According to an aspect of the invention, there is provided a reproduction apparatus and method which reproduce AV data in synchronization with additional data by generating an event using a Presentation Time Stamp (PTS) value of an Entry Point Map as a variable for designating an event occurrence time point.

According to an aspect of the invention, there is provided an information storage medium, including: core data, which includes AV data and navigation data for reproducing the AV data; and program data which is used for interaction with a user, wherein the program data includes event occurrence information for generating an event with reference to a clip information file including characteristic information for an AV clip constructing the AV data.

According to an aspect of the invention, program data may be application data written by a JAVA language.

According to an aspect of the invention, event occurrence information may be information that requires an event to be generated when a time point corresponding to a specific Presentation Time Stamp (PTS) included in the clip information file is reproduced.

According to another aspect of the invention, event occurrence information may be information that requires an event to be generated when a time point corresponding to a predetermined mark included in the clip information file is reproduced.

According to yet another aspect of the invention, event occurrence information may be information that requires an event to be generated when a packet corresponding to a predetermined specific location included in the clip information file is reproduced.

According to another aspect of the invention, there is provided a reproduction apparatus including: a reader, which reads AV data and program data including event occurrence information; a program engine, which executes the program data and outputs the event occurrence information; and a presentation engine, which reproduces the AV data and generates an event when AV data at a corresponding time point is reproduced according to event occurrence information generated with reference to a clip information file including characteristic information for an AV clip constructing the AV data.

According to another aspect of the invention, there is provided a reproduction method including: reading AV data and program data including event occurrence information; executing the program data and interpreting and outputting the event occurrence information; and reproducing the AV data, and generating an event when AV data at a corresponding time point is reproduced according to event occurrence information created with reference to a clip information file including characteristic information for an AV clip constructing the AV data.

According to another aspect of the invention, there is provided a reproduction and/or recording apparatus, including a reader that reads audio/video data and program data including event occurrence information; a program engine that executes the program data and outputs the event occurrence information; and a presentation engine that reproduces the audio/video data and generates an event when audio/video data at a corresponding time point is reproduced according to the event occurrence information created with reference to a clip information file that includes characteristic information for an audio-video clip constructing the audio-video data.

According to another aspect of the invention, there is provided a reproduction method including reading audio/video data and program data including event occurrence information; executing the program data and interpreting and outputting the event occurrence information; and reproducing the audio/video data, and generating an event when audio/video data at a corresponding time point is reproduced according to the event occurrence information created with reference to a clip information file that includes characteristic information for an audio-video clip constructing the audio-video data.

According to another aspect of the invention, there is provided a reproduction apparatus for reproducing information stored on a medium, including a reader that reads audio/video data and program data including event occurrence information; a presentation engine to reproduce the read audio/video data and program data and generate an event when related audio/video data is reproduced; and a program engine to control the presentation engine through an application program interface, wherein the program data includes event occurrence information generating an event with reference to a clip information file that includes characteristic information for an audio-video clip constructing the audio-video data.

According to another aspect of the invention, there is provided a method of reproducing information that is stored on a medium, including reading audio/video data and program data including event occurrence information; and reproducing the read audio/video data and program data and generating an event when related audio/video data is reproduced by a reproducing apparatus, wherein the program data includes event occurrence information executing an application synchronously with the audio/video data such that an event is generated with reference to a clip information file that includes characteristic information for an audio-video clip constructing the audio-video data.

According to another aspect of the invention, an event occurrence table may store event occurrence information for generating an event at a predetermined reproduction time point of AV/video data, in a form of a binary table.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the invention will become more apparent by describing in detail exemplary embodiments thereof with reference to the attached drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
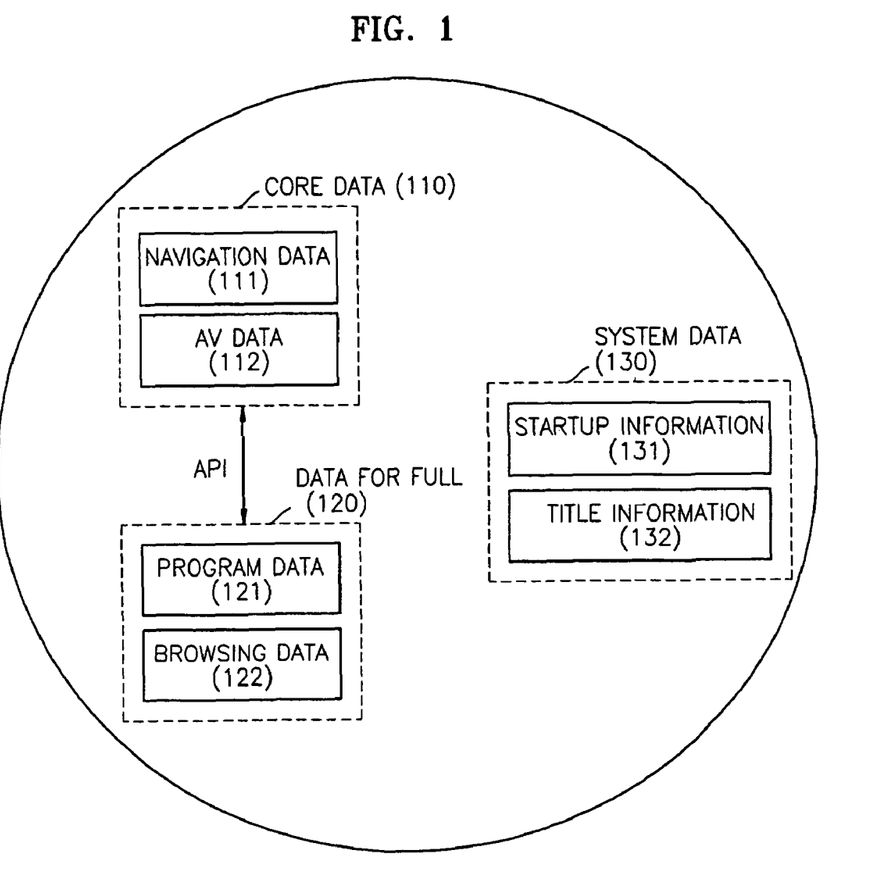
FIG. 1 shows data types to be stored in an information storage medium according to an aspect of the invention.

FIG. 1 shows data types to be stored in an information storage medium according to the invention. Referring to FIG. 1, core data 110 includes AV data 111 and navigation data 112. The navigation data 112 is a collection of navigation commands for reproducing the AV data. The core data is also referred to as core mode data. The core data 110 is data that is used in a video application such as DVD and is required for showing a video, such as a movie. A mode that reproduces such core data 110 is referred to as a movie mode.

Data for reinforcing various interactions with a user is generally known as Data for Full 120. The Data for Full 120 is also referred to as Data for Full mode. The Data for Full mode includes program data 121 for providing various interactions with a user and browsing data 122 to allow network browsing, such as Internet browsing. The program data 121 is, for example, a java application that provides various user interaction functions. The browsing data 122 includes markup documents written with a markup language, such as XML, markup documents including or linking script codes, such as ECMA script, script files, at least one image referenced by the markup documents, and resource files such as graphics and sounds. The core data 110 is able to communicate with the Data for Full 120 through application program interface (API). The program data 121 includes event occurrence information for generating event at a time and/or location designated by the AV data 112.

System data 130 includes at least startup information 131 and title information 132. The system data 130 is read when the information storage medium is booted or inserted. The system data that is read when the storage medium is booted or inserted does not belong to a specific mode.

The AV data recorded on the information storage medium is able to be reproduced in a plurality of modes, including: a core mode that reproduces data in a movie mode using the navigation data as the data for code mode, as described above, and a full mode that allows AV data to be displayed through a display window defined in an application made by a program language as Data for Full mode. When the full mode is selected by a user or by a navigation flow, a display window for displaying moving-image data is created by a function programmed in an application (for example, Java application using a Java language as a programming language) made by a programming language, AV data is controlled and displayed through the API, and simultaneously JAVA-based contents or various resources (for example, image, audio, etc.) referred in the JAVA application are displayed in synchronization of reproduction of the AV data. However, to display the AV data through the display window defined in the JAVA application in the above-described full mode, synchronization of the AV data and the JAVA application is necessary.

Figure 2:
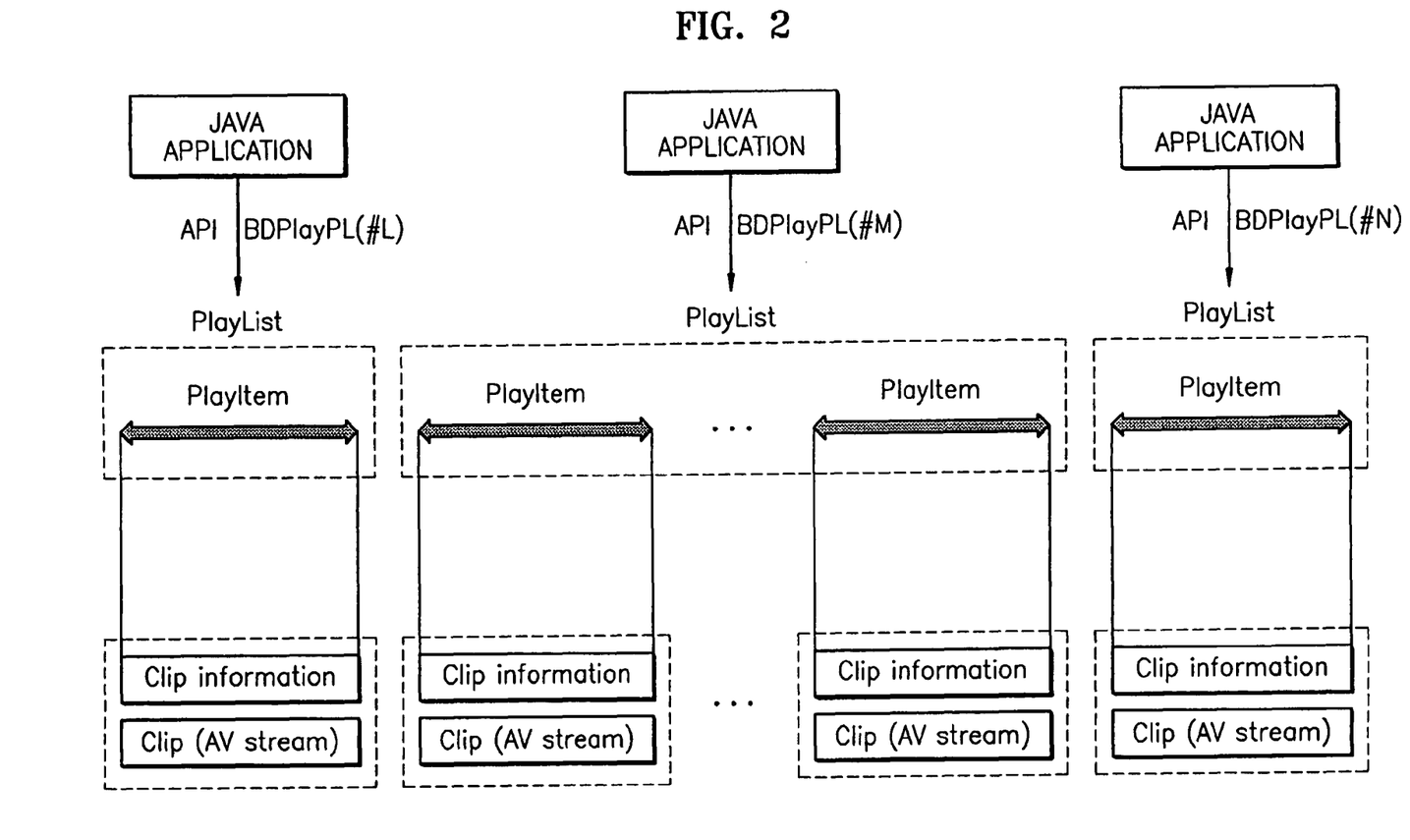
FIG. 2 shows correlations of PlayList, PlayItem, Chip Information, and Clip, constructing AV data.

FIG. 2 shows correlations of PlayList, PlayItem, Clip Information, and Clip, constructing AV data. Referring to FIG. 2, the JAVA application controls the AV data through API, such as "BDPlayPL" (PlayList Number), as Data for Full mode. The PlayList is a fundamental unit of reproduction and the information storage medium stores a plurality of PlayLists. The PlayList includes a plurality of PlayItems that are connected to one another. The PlayItem designates one part of a Clip, particularly, the PlayItem is used to designate a reproduction start time and a reproduction end time of the Clip. Accordingly, the corresponding part in a Clip is searched using Clip information. An AV stream is recorded using a Clip as a fundamental unit. Clips are typically recorded on a continuous space, respectively, and are compressed to reduce theirs capacities.

To reproduce the recorded Clips, it is necessary to detect characteristic information of the compressed presentation data. Clip information is recorded for each Clip. The Clip information includes audio and video properties of each Clip, Entry Point Map storing location information of Entry Point allowing random access per a predetermined interval, etc. In a case of MPEG as a general moving-image compression technique, Entry Point is an I picture or a Group of Pictures (GOP) header used as a random access point. The Entry point Map is used in a time search for detecting a time point elapsed by a predetermined time after the reproduction begins.

In the invention, the location of the I picture in the GOP is used as a variable for generating an event. For example, an event is generated using a PTS value recorded in the entry point map included in the clip information. Additional data which should be reproduced when the event is generated includes information indicating that an event is generated at a predetermined PTS value. Accordingly, while an AV stream is reproduced, by informing the additional data of generating an event when a source packet corresponding to the PTS value designated as an event occurrence time by the additional data is generated, the additional data performs an operation corresponding to the event.

Figure 3:
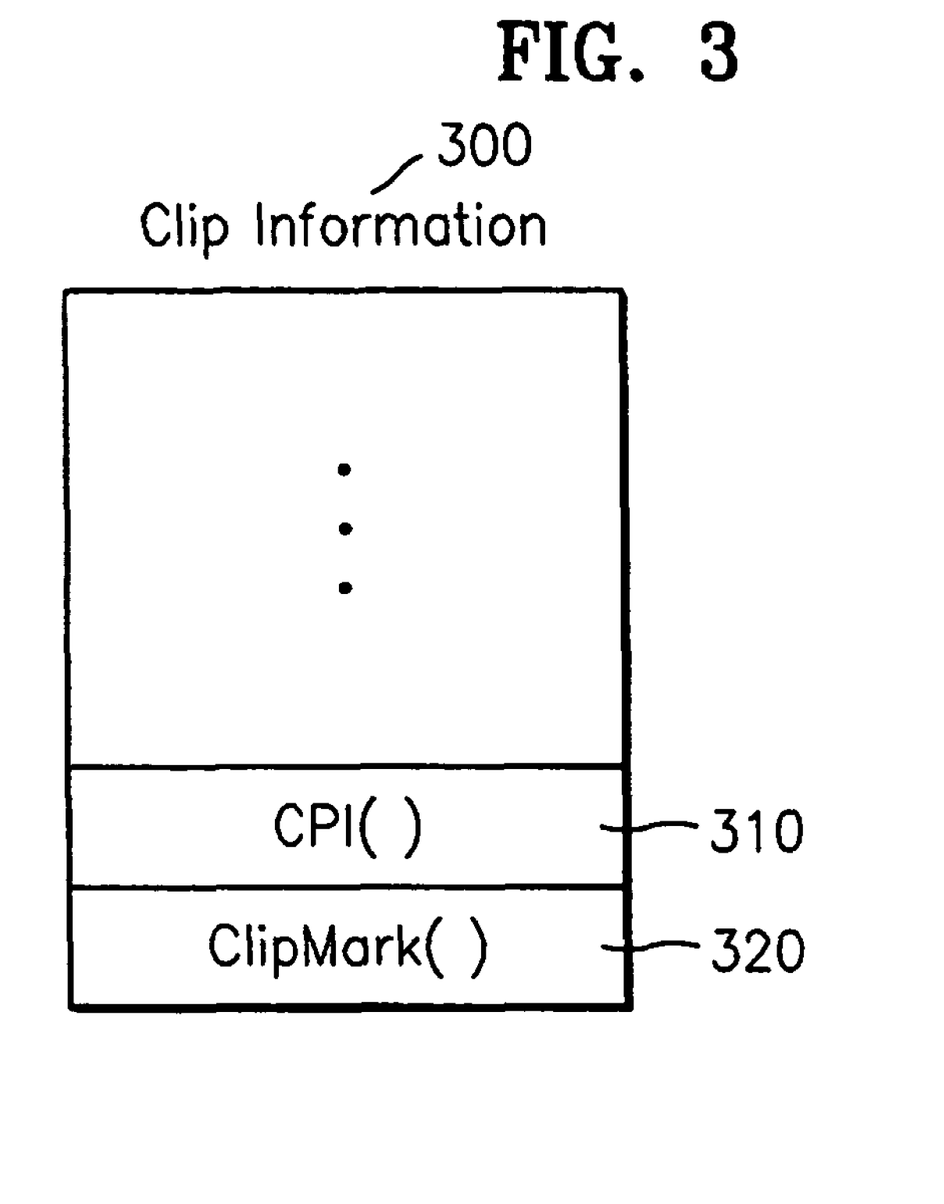
FIG. 3 shows the configuration of the Clip Information.

FIG. 3 shows a configuration of the Clip Information. Referring to FIG. 3, the Clip Information 300 includes at least Characteristic Point Information (CPI) 310 and ClipMark( ) 320. CPI 310 includes Entry Point Map (EP_map) information. The EP_map is a table including additional information for an entry point of a corresponding clip. Entry Point in the MPEG video coding standard indicates a start point of an image coded as an I picture. The EP_map information provides a relationship between a PTS value and its address in an AV stream file. When an entry point of the PTS value is represented as "PTS_EP_start", and the address of the entry point is represented as "SPN_EP_start", information including Source Packet Number (SPN) corresponding to the PTS is included in the EP_map. Meanwhile, ClipMark( ) 320 is used as information for embedding Mark at a specific location in the AV stream file.

Accordingly, CPI( ) or ClipMark( ) are used as parameters for generating a trigger event as will be described later. The trigger event is an event, which generates an event at a specific time point while a moving-image is reproduced, and which reproduces additional data in synchronization with the moving-image or generates a specific variable to perform a predetermined operation according to the generated event. That is, when the trigger event is generated, the trigger event reproduces additional data related to a reproduced moving-image so that the additional data is shown to a user, or changes the reproduction state of the moving-image, etc.

As described above, the Ep_map includes a table describing information for reproducible locations randomly accessed by the user as source packet number (SPN) corresponding to the PTS. The PTS value is used as a variable for generating an event. More specifically, the location of an I picture in a GOP defined in the MPEG is used as a variable for generating an event. That is, the location of the I picture is used as an event occurrence location so that the event can be generated for each GOP unit. Generally, since a reproduction apparatus for reproducing an AV stream performs decoding and reproducing for each GOP unit, it is not preferable to generate the event using a smaller time unit than the time unit corresponding with the PTS.

Further, the API used in the JAVA application and required parameters will be described in more detail.

1. BDVideo.SetTrigger (trigger_id, Clip_Information_file_name, PTS_EP_start, ref)
    meaning: generate a trigger event when a clip is reproduced at a PTS value in designated clip information
    parameters:
    trigger_id: trigger event identifier
    Clip_Information_file_name: name of clip information for a clip in which a trigger event will be generated
    PTS_EP_start: entry point of a PTS value in clip information for a clip in which a trigger event will be generated
    ref: value to be included in an event variable when an event is called up 2. BDVideo.SetTrigger (trigger_id, Clip_AV_stream_file_name, SPN_EP_start, ref)
    meaning: generate a trigger event when a source packet number of a designated clip AV stream is reproduced
    2) parameters:
    trigger_id: trigger event identifier
    Clip_AV_stream_file_name: name of an AV stream in which a trigger event will be generated
    SPN_EP_start: start point of a source packet in a clip AV stream in which a trigger event will be generated
    ref: value to be included in an event variable when an event is called up 3. BDVideo.SetTrigger (trigger_id, Clip_AV_stream_file_name, ClipMark( ), ref)
    1) meaning: generate a trigger event when ClipMark in designated clip information is reproduced
    2) parameters:
    trigger_id: trigger event identifier
    Clip_Information_file_name: name of clip information for a clip in which a trigger event will be generated
    ClipMark( ): ClipMark in clip information for a clip in which a trigger event will be generated
    ref: value to be included in an event variable when an event is called up BDVideo.ClearTrigger(trigger_id)
    1) meaning: release a requested trigger event
    2) parameters:
    trigger_id: trigger event identifier (for example, if "−1" is designated as trigger_id, this can be used as meaning of commanding the release of all generated trigger events)

Figure 4:
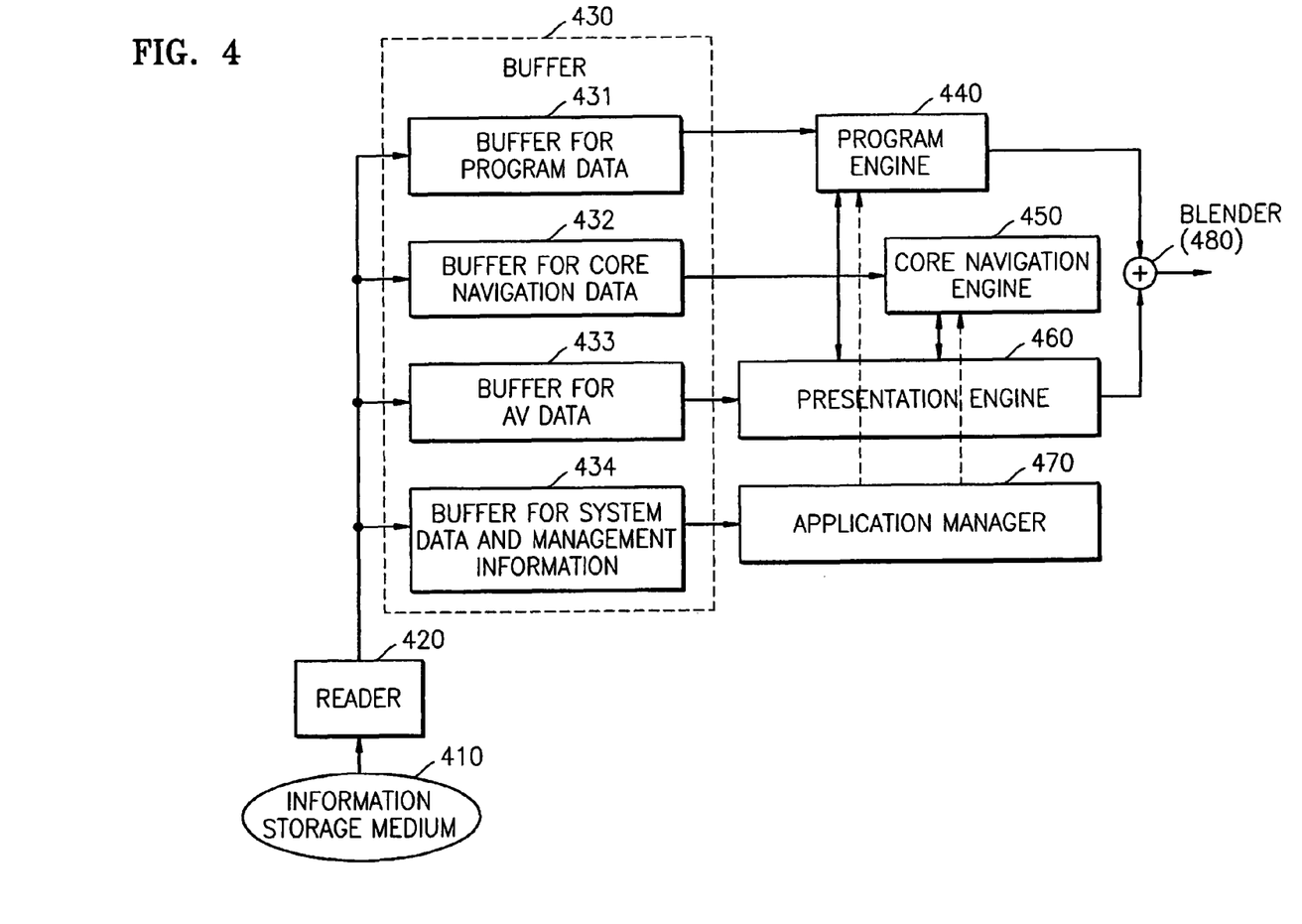
FIG. 4 is a block diagram of a reproduction apparatus, according to an embodiment of the invention.

FIG. 4 is a block diagram of a reproduction apparatus, according to an aspect of the invention. The reproduction apparatus displays AV data recorded on an information storage medium using data for a specific mode according to a display method. Referring to FIG. 4, the reproduction apparatus comprises a reader 420, a buffer 430, a program engine 440, a core navigation engine 450, a presentation engine 460, a application engine 470, and a blender 480.

The reader 420 reads AV data, program data, core navigation data, and system data from the information storage medium 410 and transfers the read data to the respective corresponding buffers 431, 432, 433 and 434. The respective buffers (buffer 431 for program data, buffer 432 for core navigation data, buffer 433 for AV data, and buffer 433 for system data and management information) buffer the received data, respectively. The buffered results are transmitted to the respective corresponding engines for reproduction and are reproduced by the respective engines. The respective engines include, for example, a program engine, a core navigation engine, a presentation engine, and an application manager. At this time, the system data is transferred to the application manager 470. The application manager 470 determines a mode and data to be first reproduced based on an entry point of start-up data in the system data.

While the respective AV data is reproduced, entry points of respective objects generated due to conversion between modes or title search are transferred to corresponding reproduction engines capable of reproducing the corresponding objects, with reference to the system data, thereby reproducing the respective objects. The application manager 470 may also include a user input receiving unit and a user input processing unit in order to transfer a user input to an engine for corresponding mode. The presentation engine 460 decodes and reproduces moving-image data and still-image streams and/or data files. The program engine 440 controls the presentation engine 460 through the API, like the core navigation engine 450.

The program engine 440 executes the JAVA application including the above described various event occurrence information and transfers the event occurrence information to the presentation engine 460. The presentation engine 460 generates an event at the time point that it reproduces a time point or location corresponding to the event occurrence information (i.e., PTS value or ClipMark of a specific clip information, or specific location in a clip AV stream), while reproducing AV data.

As such, if an event is generated at a specific time point or location according to the event occurrence information, the program engine 440 recognizes the generation and executes a corresponding operation according to a program function programmed by the JAVA application. The event occurrence information can be recorded in an event occurrence table 495, and a process for generating an event using the event occurrence table 495 and an event manager 490 will be described later.

Figure 5:
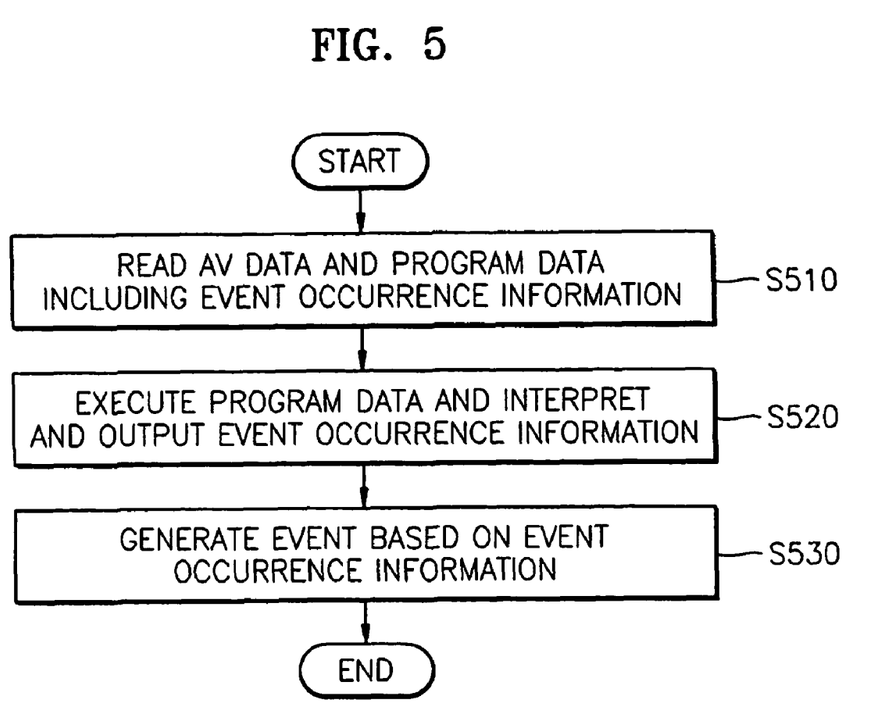
FIG. 5 is a flowchart illustrating a reproduction method according to an embodiment of the invention.

FIG. 5 is a flowchart illustrating a reproduction method according to the invention. Referring to FIG. 5, if a specific JAVA application is executed by a user input or a navigation command, etc., the program engine 440 interprets event occurrence information (for example, APIs) included in the JAVA application and transfers a corresponding parameter value to the presentation engine 460 in step S510. The corresponding parameter of the API has been described above. The presentation engine 460 detects a designated time point or location of a clip corresponding to the transferred parameter value in operation 520 and generates a corresponding event when a clip at the detected event occurrence time point or location is reproduced in operation 530. When the event is generated, the program engine 440 recognizes the event occurrence, calls up an event handler function programmed in the JAVA application, and executes a specific operation in synchronization of the reproduction time-point of the corresponding clip.

As described above, the presentation engine 460 may generate an event at an event occurrence location while the presentation engine 460 reproduces AV data, by inserting event occurrence information in the AV data. Hereinafter, a method that stores event information synchronized to AV data in a separate location without changing the AV data and transfers the event information to the presentation engine 460, is described.

An event is generated using an event occurrence table 495 in which event occurrence information is placed in the table in a form of binary data in order for the event to be generated at a specific reproduction location of AV data, separately from program data such as a JAVA application (referred to as "tablizing" information). Such an event generation table is interpreted and managed by an application manager 470 or an event manager 490. Tablizing information in a form of binary data refers to a method that stores information needed for event occurrence by providing meanings to each of predetermined bits of a series of binary data.

The event occurrence table includes identifiers for identifying events, event occurrence time information, information for a JAVA application operated by an event, parameter information to be transferred to a JAVA application operated by an event, and additional information.

The event identifier is information for identifying an event, such as an identifier trigger_id of a trigger event used in an event occurrence function, and is for example Event_ID. The event occurrence time can be a value of reproduction time information, such as an elapsed time, or a value of unique information of an AV stream such as PTS, SPN, ClipMark. The JAVA application information is information used for identifying a JAVA application to be executed. The JAVA application information can be an ID or name of an application. The parameter information is parameter information that must be transferred to a JAVA application to be executed according to a type of an event. The parameter information can have various values according to a type of an event and characteristics of a JAVA application that operates in correspondence to the event. The additional information is used to additionally store information, such as meta data, and can be omitted. Table 1 is an example of the event occurrence table.

TABLE 1

| Event identifier | Event occurrence time | Application information | Additional information | Parameter information |
| --- | --- | --- | --- | --- |
| Event_ID | PTS, SPN, ClipMark( ), reproduction elapsed time | Application 1 | JAVA application for deleted pictures | Parameter 1 = a Parameter 2 = b |
| ... | ... | ... | ... | ... |

Figure 6:
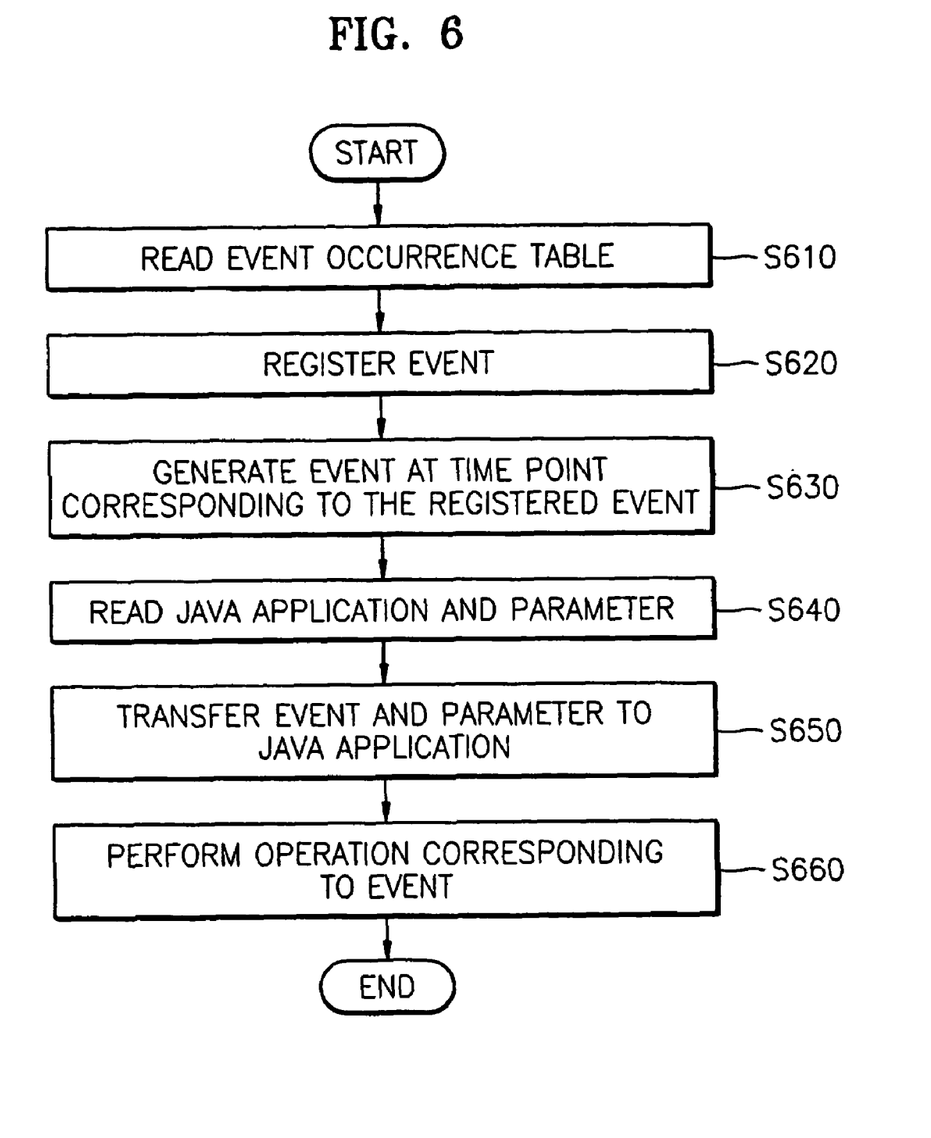
FIG. 6 is a flowchart illustrating a process that generates an event and reproduces AV data.

FIG. 6 is a flowchart illustrating a process that generates an event and reproduces AV data, using an event occurrence table, such as Table 1.

When a disc is inserted into a reproduction apparatus, the application manager 470 or the event manager 490 reads information stored in the event occurrence table in operation 610. Then, the application manager 470 or the event manager 490 registers an event in the program engine 440 using an event identifier and event occurrence time information in operation 620. Thereafter, while AV data is reproduced, the program engine 440 generates the event at a time point corresponding to the registered event in operation 630. The program engine 440 reads a JAVA application for performing a predetermined operation in response to the corresponding event, and parameters, which must be transferred to the JAVA application, from the application manager 470 or event manager 490 that has read the event occurrence table, using the generated event identifier, in operation 640. The parameters and the generated event are transferred to the JAVA application in operation 650. Thus, the JAVA application that has received the event performs the predetermined operation corresponding to the generated event in synchronization to the AV data in operation 660.

When a new event is generated while the JAVA application operates, the JAVA application receives new parameter values defined in the event occurrence table according to the contents of the generated event and performs a different operation in synchronization to AV data. When a JAVA application indicated by the generated event is not being executed when the event occurrence table is searched for through the application manager or event manager in order to perform the corresponding operation according to the event occurrence, the program engine can ignore the generated event, or can execute the corresponding JAVA application and then transfer the generated event to the JAVA application.

In the event occurrence and AV data reproduction method described above with reference to FIG. 5, an event with a specific reproduction time is registered in a specific JAVA application through programming and also operations to be executed when the event is generated, are programmed in the corresponding JAVA application. However, in the event occurrence and AV data reproduction method described above with reference to FIG. 6, even parameter information that must be transferred and/or information for a JAVA application that must operate when an event is generated, are written in a form of a table, so that the event is generated using these information.

As shown in Table 1, the event occurrence table can include event identifiers, event occurrence time information, JAVA application information, and additional information; however, the event occurrence table is able to include only event identifiers and event occurrence time information as basic information. When the event occurrence table only includes the basic information, it is difficult or impossible to know that JAVA application receives an event and operates a corresponding operation when the program engine generates the event.

Therefore, a JAVA application that must receive a generated event and perform a predetermined operation includes "event listener" for recognizing an event identifier of the generated event. The JAVA application is preferably made at the same time that a storage medium in which AV data is recorded is manufactured. Event listener is a type of function and is defined in a JAVA application that includes the corresponding function. Information included in the JAVA application is various; however, the JAVA application may include specific operation functions that must be performed when an event is generated, for each of event identifiers. Such an event listener is defined in a JAVA application to be operated when an event with a specific event identifier is generated. Accordingly, when the program engine generates an event with a specific event identifier while the presentation engine performs a reproduction operation, all JAVA applications that include event listeners in the program engine and are currently being reproduced, receive the event identifier of the currently generated event as a parameter through the event listeners.

When each of the JAVA applications is programmed in a manner to operate a specific operation while a corresponding event identifier is generated in its own event listener, the JAVA application performs the specific operation while receiving the event identifier. Otherwise, the JAVA application operates according to a separate program sequence or ignores the received event identifier.

The invention may also be embodied as a program stored on a computer readable medium that can be run on a general computer, such as a personal computer. Here, the computer readable medium includes but is not limited to, storage media such as magnetic storage media (e.g., ROM's, floppy disks, hard disks, etc.), and optically readable media (e.g., CD-ROMs, DVDs, etc. The invention may also be embodied as a computer readable program code unit stored on a computer readable medium, for causing a number of computer systems connected via a network to affect distributed processing.

As described above, the invention can set an event occurrence time using an AV data structure and generate a specific event at the set time. Accordingly, it is possible to output an application picture in synchronization with an AV picture.

Operations may be performed according to event occurrence without changing an AV data structure, by storing event occurrence information in a table format, without including the event occurrence information in AV data.

Further, it is possible to easily add or correct trigger events by defining a separate API capable of registering an event using the location of a source packet or the PTS value defined by the EP_map as a variable, a class for event registration, etc., and including corresponding event registration information in additional data separately from moving-image data.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-transitory computer-readable information storage medium, comprising:
    core data comprising audio/video data and navigation data used by a reproducing apparatus for reproducing the audio/video data; and
    program data, separate from the core data, that is used by the reproducing apparatus for interaction with a user,
    wherein the program data comprises event occurrence information that, when read and executed by the reproducing apparatus, is configured to cause the reproducing apparatus:
        to generate an event with reference to a clip information file comprising characteristic information for an audio-video clip constructing the audio-video data at a time corresponding to the event occurrence information, and
        to execute an operation corresponding to the event if the event is generated, and
    wherein the event occurrence information is information that requires an event to be generated;
        when a time point corresponding to a specific Presentation Time Stamp included in the clip information file is reproduced or,
        when a time point corresponding to a predetermined mark included in the clip information file is reproduced or,
        when a packet corresponding to a predetermined specific location included in the clip information file is reproduced.

2. The non-transitory computer-readable information storage medium as claimed in claim 1, wherein the program data is application data written according to a JAVA language.

3. The non-transitory computer-readable information storage medium as claimed in claim 2, wherein the application data written by the JAVA language controls the audio/video data through an application program interface.

4. The non-transitory computer-readable information storage medium as claimed in claim 1, wherein the event occurrence information is information that requires an event to be generated when a time point corresponding to a predetermined mark included in the clip information file is reproduced.

5. The non-transitory computer-readable information storage medium as claimed in claim 1, wherein the event occurrence information comprises an event identifier as a parameter for generating the event.

6. A reproduction and/or recording apparatus, comprising:
    a reader configured to read, from a computer-readable information storage medium, audio/video data and program data including event occurrence information, the program data being separate from the audio/video data;
a program engine configured to execute the program data and output the event occurrence information; and
a presentation engine configured to:
reproduce the audio/video data;
generate an event when audio/video data at a corresponding time point is reproduced according to the event occurrence information created with reference to a clip information file comprising characteristic information for an audio-video clip constructing the audio-video data at a time corresponding to the event occurrence information; and
execute an operation corresponding to the event if the event is generated, and
wherein the event occurrence information is information that requires an event to be generated;
when a time point corresponding to a specific Presentation Time Stamp included in the clip information file is reproduced or,
when a time point corresponding to a predetermined mark included in the clip information file is reproduced or,
when a packet corresponding to a predetermined specific location included in the clip information file is reproduced.

7. The reproduction and/or recording apparatus as claimed in claim 6, wherein the program data comprises a JAVA application program.

8. The reproduction and/or recording apparatus as claimed in claim 6, wherein the presentation engine is further configured to generate an event when a time point corresponding to a predetermined mark included in the clip information file is reproduced.

9. The reproduction and/or recording apparatus as claimed in claim 6, further comprising an event occurrence table configured to store event occurrence information generating an event at a predetermined reproduction time of audio/video data.

10. The reproduction and/or recording apparatus as claimed in claim 9, wherein the event occurrence table is written in a binary data format.

11. The reproduction and/or recording apparatus as claimed in claim 9, wherein the event occurrence table comprises:
an event identifier that identifies an event; and
event occurrence time information comprising a value of reproduction time information, such as an elapsed time, or a value of unique information of the audio/video data.

12. The reproduction and/or recording apparatus as claimed in claim 11, wherein the event occurrence table further comprises:
information, that receives the generated event and identifies a JAVA application to be executed according to the received event;
parameter information, that is transferred to the JAVA application to be executed according to the generated event; and
additional information comprising meta data.

13. A reproduction method, comprising:
reading, from a computer-readable information storage medium, audio/video data and program data including event occurrence information, the program data being separate from the audio/video data;
executing the program data;
interpreting and outputting the event occurrence information;
reproducing the audio/video data;
generating an event when audio/video data at a corresponding time point is reproduced according to the event occurrence information created with reference to a clip information file comprising characteristic information for an audio-video clip constructing the audio-video data at a time corresponding to the event occurrence information; and
executing an operation corresponding to the event if the event is generated, and
wherein the event occurrence information is information that requires an event to be generated;
when a time point corresponding to a specific Presentation Time Stamp included in the clip information file is reproduced or,
when a time point corresponding to a predetermined mark included in the clip information file is reproduced or,
when a packet corresponding to a predetermined specific location included in the clip information file is reproduced.

14. The reproduction method as claimed claim 13, wherein the executing the program data comprises:
a JAVA application program including the event occurrence information;
interpreting the event occurrence information; and
outputting a parameter value corresponding to the event occurrence information.

15. The reproduction method as claimed in claim 14, wherein the reproducing the audio/video data further comprises detecting a location of data corresponding to the parameter value and generating an event when the data at the location is reproduced.

16. The reproduction method as claimed in claim 13, wherein the reproducing the audio/video data further comprises generating an event when a time point corresponding to a specific Presentation Time Stamp included in the clip information file is reproduced.

17. The reproduction method as claimed in claim 13, wherein the reproducing the audio/video data further comprises generating an event when a time point corresponding to a predetermined mark included in the clip information file is reproduced.

18. The reproduction method as claimed in claim 13, wherein the reproducing the audio/video data further comprises generating an event when a packet corresponding to a predetermined specific location included in the clip information file is reproduced.

19. The reproduction method as claimed in claim 13, further comprising releasing the event after generating the event.

20. A non-transitory computer-readable information storage medium, comprising:
audio/video data; and
program data that is executed in synchronization with the audio/video data and enables user interaction, the program data being separate from the audio/video data,
wherein:
the program data comprises event occurrence information to execute an application in synchronization with the audio/video data such that an event is generated by a reproducing apparatus with reference to with reference to a clip information file comprising characteristic information for an audio-video clip constructing the audio-video data at a time corresponding to the event occurrence information, and
an operation corresponding to the event is executed if the event is generated, and wherein the event occurrence information is information that requires an event to be generated;
when a time point corresponding to a specific Presentation Time Stamp included in the clip information file is reproduced or,
when a time point corresponding to a predetermined mark included in the clip information file is reproduced or,
when a packet corresponding to a predetermined specific location included in the clip information file is reproduced.

21. The non-transitory computer-readable information storage medium as claimed in claim 20, further comprising navigation data that controls reproduction of the audio/video data.

22. A method of storing information on a storage medium, the method comprising:
storing, on the storage medium, audio/video data and program data that is executed synchronously with the audio/video data and enables user interaction, the program data being separate from the audio/video data,
wherein:
the program data comprises event occurrence information executing an application synchronously with the audio/video data such that an event is generated with reference to a clip information file comprising characteristic information for an audio-video clip constructing the audio-video data at a time corresponding to the event occurrence information, and
an operation corresponding to the event is executed if the event is generated, and
wherein the event occurrence information is information that requires an event to be generated,
when a time point corresponding to a specific Presentation Time Stamp included in the clip information file is reproduced or,
when a time point corresponding to a predetermined mark included in the clip information file is reproduced or,
when a packet corresponding to a predetermined specific location included in the clip information file is reproduced.

23. The method of storing information on a storage medium as claimed in claim 22, further comprising using navigation data to control reproduction of the audio/video data.

24. A reproduction apparatus for reproducing information stored on a medium, the apparatus comprising:
a reader configured to read, from the medium, audio/video data and program data including event occurrence information, the program data being separate from the audio/video data;
a presentation engine configured to reproduce the read audio/video data and program data and generate an event when related audio/video data is reproduced; and
a program engine configured to control the presentation engine through an application program interface, and
wherein:
the program data comprises event occurrence information generating an event with reference to a clip information file comprising characteristic information for an audio-video clip constructing the audio-video data at a time corresponding to the event occurrence information, and
the presentation engine is further configured to execute an operation corresponding to the event if the event is generated, and
wherein the event occurrence information is information that requires an event to be generated;
when a time point corresponding to a specific Presentation Time Stamp included in the clip information file is reproduced or,
when a time point corresponding to a predetermined mark included in the clip information file is reproduced or
when a packet corresponding to a predetermined specific location included in the clip information file is reproduced.

25. A method of reproducing information that is stored on a medium, the method comprising:
reading, from the medium, audio/video data and program data including event occurrence information, the program data being separate from the audio/video data; and
reproducing the read audio/video data and program data and generating an event when related audio/video data is reproduced by a reproducing apparatus,
wherein:
the program data comprises event occurrence information executing an application synchronously with the audio/video data such that an event is generated with reference to a clip information file comprising characteristic information for an audio-video clip constructing the audio-video data at a time corresponding to the event occurrence information, and
an operation corresponding to the event is executed if the event is generated, and
wherein the event occurrence information is information that requires an event to be generated;
when a time point corresponding to a specific Presentation Time Stamp included in the clip information file is reproduced or,
when a time point corresponding to a predetermined mark included in the clip information file is reproduced or,
when a packet corresponding to a predetermined specific location included in the clip information file is reproduced.

* * * * *